(12) United States Patent
Masaki

(10) Patent No.: US 7,123,196 B2
(45) Date of Patent: Oct. 17, 2006

(54) INFORMATION DEVICE

(75) Inventor: Toshiyuki Masaki, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/975,078

(22) Filed: Oct. 28, 2004

(65) Prior Publication Data

US 2005/0093753 A1    May 5, 2005

(30) Foreign Application Priority Data

Oct. 31, 2003    (JP)    ............................ 2003-373623

(51) Int. Cl.
*H01Q 1/24* (2006.01)
(52) U.S. Cl. ........................................ 343/702
(58) Field of Classification Search ................ 343/702, 343/700 MS, 872; 455/727, 275, 277.1, 455/277.2
See application file for complete search history.

(56) References Cited

U.S. PATENT DOCUMENTS

| | | | |
|---|---|---|---|
| 5,138,328 A | | 8/1992 | Zibrik et al. |
| 6,107,967 A | * | 8/2000 | Hill ............................ 343/702 |
| 6,285,328 B1 | | 9/2001 | Masaki et al. |
| 6,373,443 B1 | * | 4/2002 | Tsai et al. .................... 343/767 |
| 6,388,627 B1 | | 5/2002 | Masaki et al. |
| 6,426,723 B1 | | 7/2002 | Smith et al. |
| 6,486,836 B1 | * | 11/2002 | Hill ............................. 343/702 |
| 6,509,877 B1 | | 1/2003 | Masaki |
| 6,618,005 B1 | * | 9/2003 | Hannah et al. .......... 342/357.1 |
| 6,642,892 B1 | | 11/2003 | Masaki |
| 6,853,336 B1 | * | 2/2005 | Asano et al. ............... 343/702 |
| 6,924,769 B1 | * | 8/2005 | Ito et al. ..................... 343/702 |
| 2002/0190905 A1 | | 12/2002 | Flint et al. |

FOREIGN PATENT DOCUMENTS

| | | |
|---|---|---|
| EP | 0 259 129 B1 | 12/1992 |
| JP | 2000-114848 A2 | 4/2000 |

OTHER PUBLICATIONS

Copy of European Search Report, dated Jan. 3, 2005, issued for European Application No. 04022546.
Communication mailed Dec. 7, 2005, by the European Patent Office, in European Patent Application No. 04 022 546.8—2220.

* cited by examiner

*Primary Examiner*—Trinh Dinh
*Assistant Examiner*—Huedung Mancuso
(74) *Attorney, Agent, or Firm*—Finnegan, Henderson, Farabow, Garrett & Dunner, L.L.P.

(57) ABSTRACT

An information device includes a main unit, a display unit which opens and closes rotatably with respect to the main unit, a first horizontally polarized antenna and a first vertically polarized antenna both provided in a first position of the display unit, and a second horizontally polarized antenna and a second vertically polarized antenna both provided in a second position of the display unit.

7 Claims, 6 Drawing Sheets

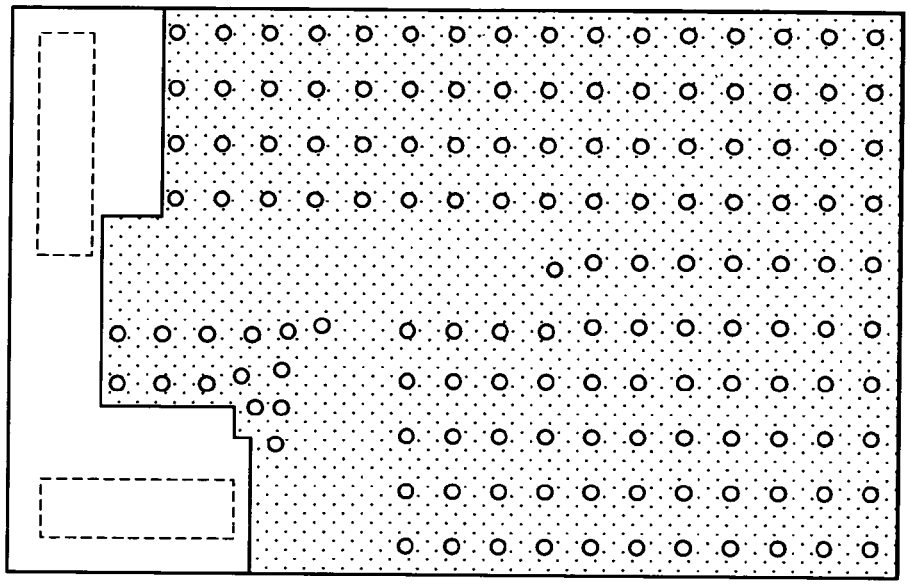
FIG. 2A  Surface
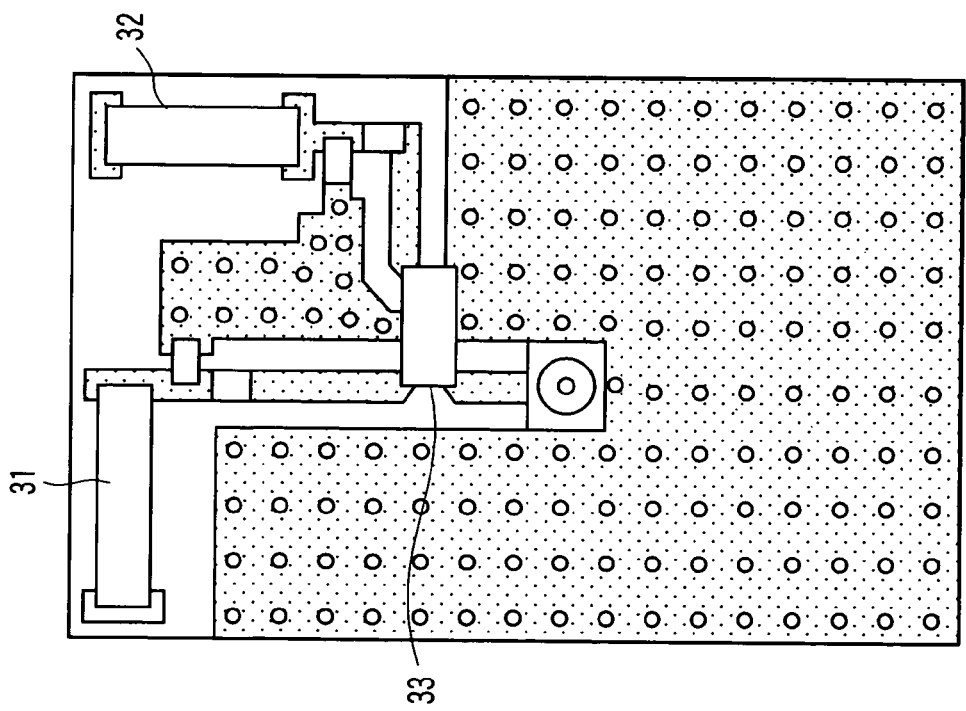
FIG. 2B  Undersurface

INFORMATION DEVICE

CROSS-REFERENCE TO RELATED APPLICATIONS

This application is based upon and claims the benefit of priority from prior Japanese Patent Application No. 2003-373623, filed Oct. 31, 2003, the entire contents of which are incorporated herein by reference.

BACKGROUND OF THE INVENTION

1. Field of the Invention

The present invention relates to an information device such as a notebook personal computer having a plurality of antennas that vary in polarization characteristics or directivity characteristics.

2. Description of the Related Art

In radio communication, a receiving antenna often adopts a diversity system to take measures against fading.

Two diversity systems are well known: one is a space diversity system in which two antennas are arranged in view of a distance between them, and the other is a polarization diversity system in which two antennas are arranged in view of an angle between them.

For example, Jpn. Pat. Appln. KOKAI Publication No. 2000-114848 discloses an antenna using a diversity system. The feature of the antenna lies in that two patch antennas are arranged on an insulating substrate symmetrically with respect to a point at a distance of a three-fourths wavelength of a transmit/receive frequency. These two antennas adopt a diversity system.

There may be a case where polarization components of transmitted waves vary among radio communication devices of communication partners and, in this case, it is desirable to configure a space diversity system by antennas capable of receiving high-level polarization components. If the levels of horizontal polarization components received by two antennas are both high, these antennas are used as horizontally polarized antennas to configure a space diversity system. In some cases, a right-side antenna can be operated as a horizontally polarized antenna and a left-side antenna can be operated as a vertically polarized antenna.

As described above, in order to secure a wide communication-capable range, the configuration of a diversity antenna can flexibly be varied according to the antenna polarization characteristics of radio communication devices of communication partners.

In the above publication, however, one of the space diversity system and the polarization diversity system has to be chosen. This causes a problem that a considerably wide communication-capable range cannot be attained.

Under the circumstances, it is desired to provide an information device having a wide communication-capable range as a diversity antenna.

BRIEF SUMMARY OF THE INVENTION

According to one aspect of the present invention, there is an information device, comprising a main unit; a display unit which opens and closes rotatably with respect to the main unit; a first horizontally polarized antenna and a first vertically polarized antenna both provided in a first position of the display unit; and a second horizontally polarized antenna and a second vertically polarized antenna both provided in a second position of the display unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A and 2B are plan views of mounting structures of the surface and undersurface of each of two antenna substrates shown in FIG. 1;

DETAILED DESCRIPTION OF THE INVENTION

Embodiments of the present invention will be described below with reference to the drawings.

Figure 1:
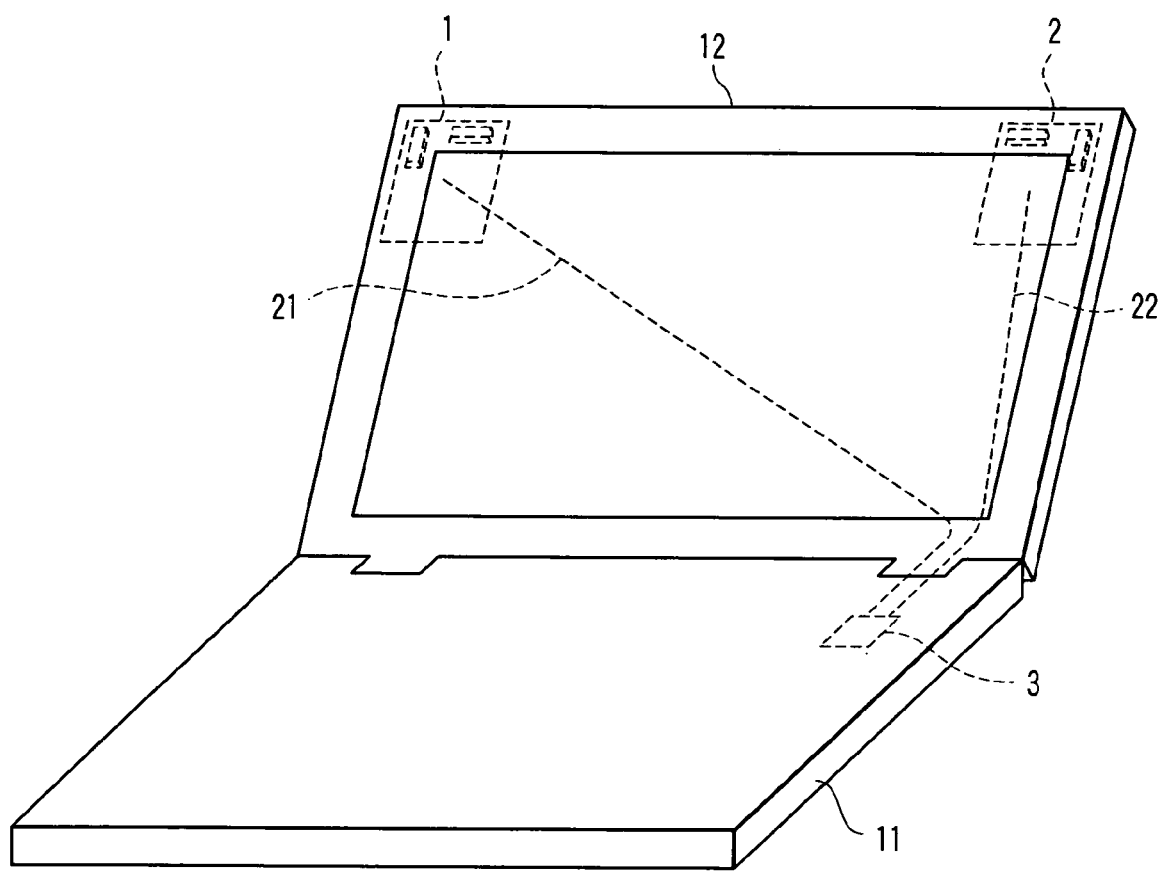
FIG. 1 is an external view of a notebook personal computer according to an embodiment of the present invention.

FIG. 1 is an external view of a notebook personal computer according to an embodiment of the present invention.

The notebook personal computer serves as an information device and includes a main unit 11 and a display unit 12. The display unit 12 is hinged on the main unit 11 to open and close rotatably with respect to the main unit 11.

Of four corners of the display unit 12, two corners (upper right and upper left portions) located above when the display unit 12 is opened include their respective antenna substrates 1 and 2 each having a combination of horizontally and vertically polarized antennas. Radiation characteristics are particularly good at the above two corners. Since the antennas can compactly be put in a housing of the display unit 12, the area exclusively for the antennas can be minimized.

The main unit 11 of the notebook personal computer includes a radio module 3. The antenna substrates 1 and 2 are electrically connected to the radio module 3 via one of the hinges by coaxial cables (or wires) 21 and 22, respectively.

FIGS. 2A and 2B are plan views of mounting structures of the surface and undersurface of each of the two antenna substrates 1 and 2 shown in FIG. 1.

As shown in FIG. 2A, a selection switch 33 as well as horizontally and vertically polarized antennas 31 and 32 is mounted on each of the antenna substrates. The antennas 31 and 32 have the same shape and are shifted 90 degrees from each other. Since the antennas 31 and 32 are so arranged, they have different polarization characteristics or directivity characteristics. The selection switch 33 selects one of the antennas 31 and 32 for use. The antenna selected by the selection switch 33 is electrically connected to the radio module 3.

Any antenna such as a ceramic chip antenna and an inverted-F antenna can be used as an antenna element. A glass epoxy substrate, a ceramic substrate and an FPC substrate can be used as each of the antenna substrates.

Figure 3:
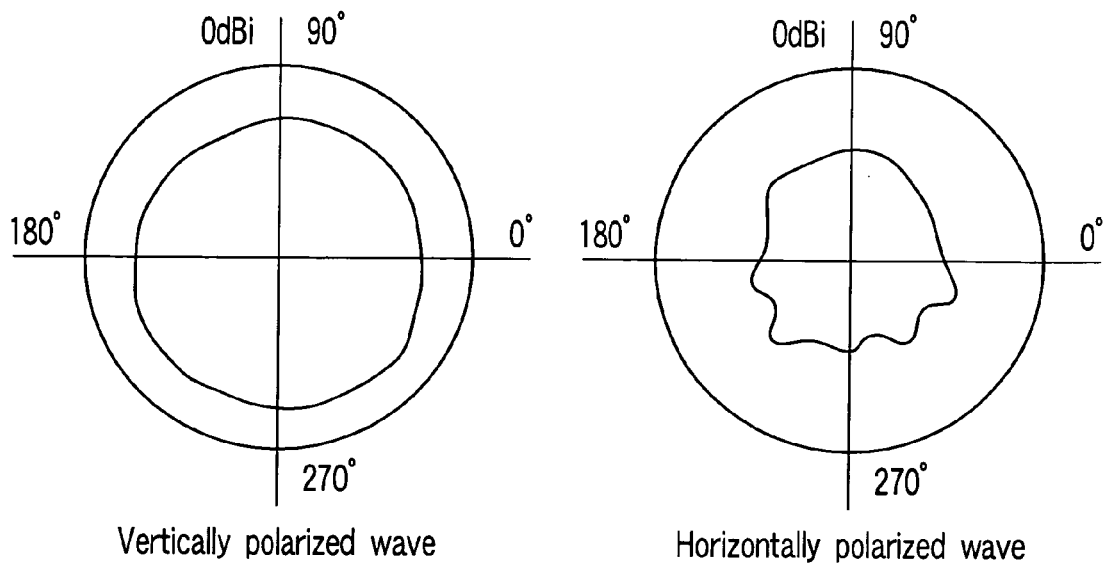
FIG. 3 is an illustration of radiation characteristics of a vertically polarized antenna shown in FIG. 2A.
Figure 4:
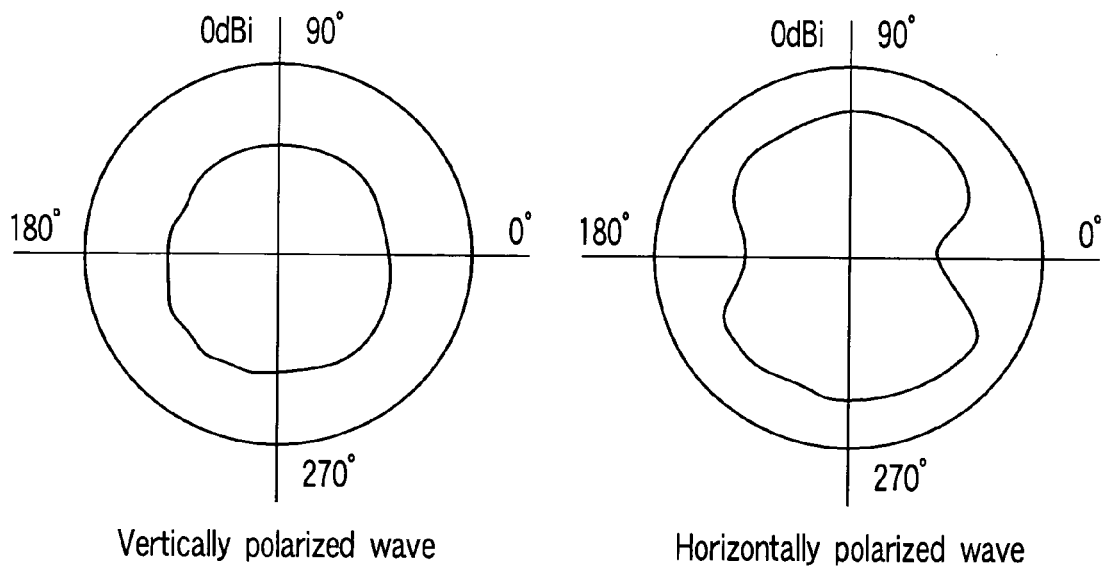
FIG. 4 is an illustration of radiation characteristics of a horizontally polarized antenna shown in FIG. 2A.

FIG. 3 illustrates radiation characteristics of the vertically polarized antenna 32 shown in FIG. 2A. FIG. 4 illustrates radiation characteristics of the horizontally polarized antenna 31 shown in FIG. 2A.

The vertically polarized antenna 32 has a characteristic that the gain of vertically polarized components is high within the X-Y plane as shown in FIG. 3. The horizontally polarized antenna 31 has a characteristic that the gain of horizontally polarized components is high within the X-Y plane as shown in FIG. 4.

The antennas receive radio waves from a radio communication device of a communication partner. One of the antennas whose reception level is high is selected. A communication-capable range can thus be widened more than that in conventional diversity antennas.

Figure 5:
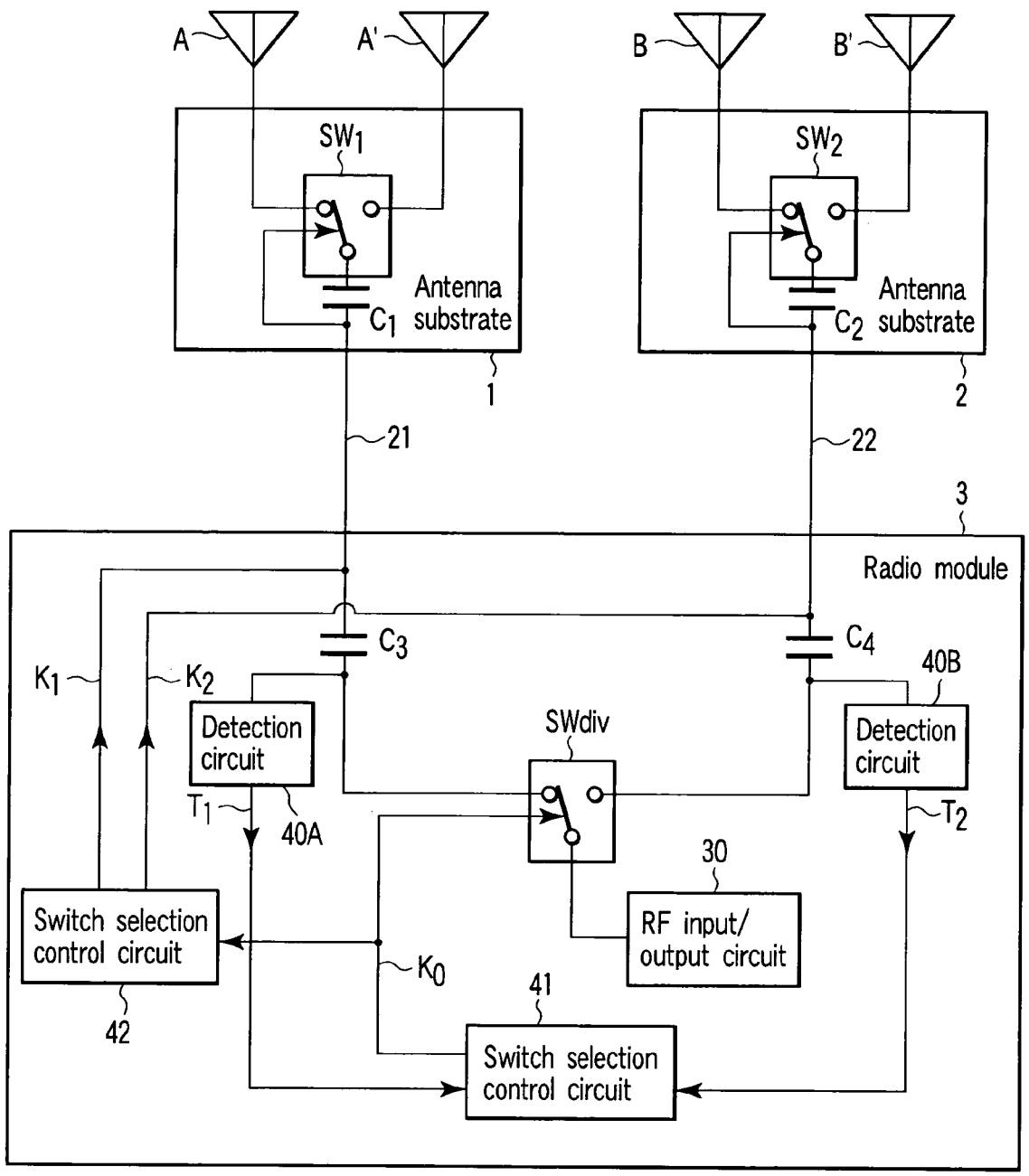
FIG. 5 is a block diagram showing a configuration of two antenna substrates and a radio module.

FIG. 5 is a block diagram showing a configuration of the antenna substrates 1 and 2 and the radio module 3. In FIG. 5, the same elements as those of FIG. 1 are indicated by the same reference numerals and symbols.

Antennas A and B shown in FIG. 5 correspond to the horizontally polarized antenna 31 shown in FIG. 2A. Antennas A' and B' shown in FIG. 5 correspond to the vertically polarized antenna 32 shown in FIG. 2A. Selection switches SW1 and SW2 shown in FIG. 5 correspond to the select switch 33 shown in FIG. 2A.

A capacitor C1 as well as the antennas A and A' and switch SW1 is mounted on the antenna substrate 1. The switch SW1 selects an antenna (one of two antennas A and A') to be electrically connected to the cable 21, in response to a selection control signal K1 transmitted from a second switch selection control circuit 42 (described later). The capacitor C1 connected to the cable 21 causes only high-frequency components to pass and stops the transmission of the selection control signal K1.

Similarly, a capacitor C2 as well as the antennas B and B' and switch SW2 is mounted on the antenna substrate 2. The switch SW2 selects an antenna (one of the two antennas B and B') to be electrically connected to the cable 21 in response to a selection control signal K2 transmitted from the second switch selection control circuit 42. The capacitor C2 connected to the cable 22 causes only high-frequency components to pass and stops the transmission of the selection control signal K2.

The radio module 3 includes the second switch selection control circuit 42 (and wires connected thereto) as well as capacitors C3 and C4, level detection circuits 40A and 40B, a diversity switch SWdiv, an RF input/output circuit 30 and a first switch selection control circuit 41. The second switch selection circuit 42 is included in none of prior art notebook personal computers.

The capacitor C3 causes only high-frequency components to pass. The level detection circuit 40A detects a level of a signal received by the antenna A or A' and sends a signal T1 indicative of the detected level to the first switch selection control circuit 41. Similarly, the capacitor C4 causes only high-frequency components to pass. The level detection circuit 40B detects a level of a signal received by the antenna B or B' and sends a signal T1 indicative of the detected level to the first switch selection control circuit 41.

The diversity switch SWdiv selects a cable (one of the two cables 21 and 22) to be electrically connected to the RF input/output circuit 30 in response to the selection control signal K0 transmitted from the first switch selection control circuit 41. The R/F input/output circuit 30 inputs/outputs signals of high-frequency components and is electrically connected to one of the cables 21 and 22 in accordance with the selection of the diversity switch SWdiv.

The first switch selection control circuit 41 compares a signal level detected by the level detection circuit 40A and a signal level detected by the level detection circuit 40B. In order to send a higher-level signal to the RF input/output circuit 30, the circuit 41 outputs the selection control signal K0 to the diversity switch SWdiv with given timing.

In response to the selection control signal K0 output from the first switch selection control circuit 41, the second switch selection control circuit 42 transmits another selection control signal K1 or K2 to the selection switch SW1 or SW2 through the cable 21 or 22.

As described above, the antennas A, A', B and B' and the simple selection switches SW1 and SW2 for selecting these antennas are arranged alongside the antenna substrates 1 and 2, while the second switch selection control circuit 42 and its associated wires, which are simpler than those of the already-existing circuit, are merely added to the radio module. A low-cost, high-performance diversity antenna can thus be achieved.

Figure 6:
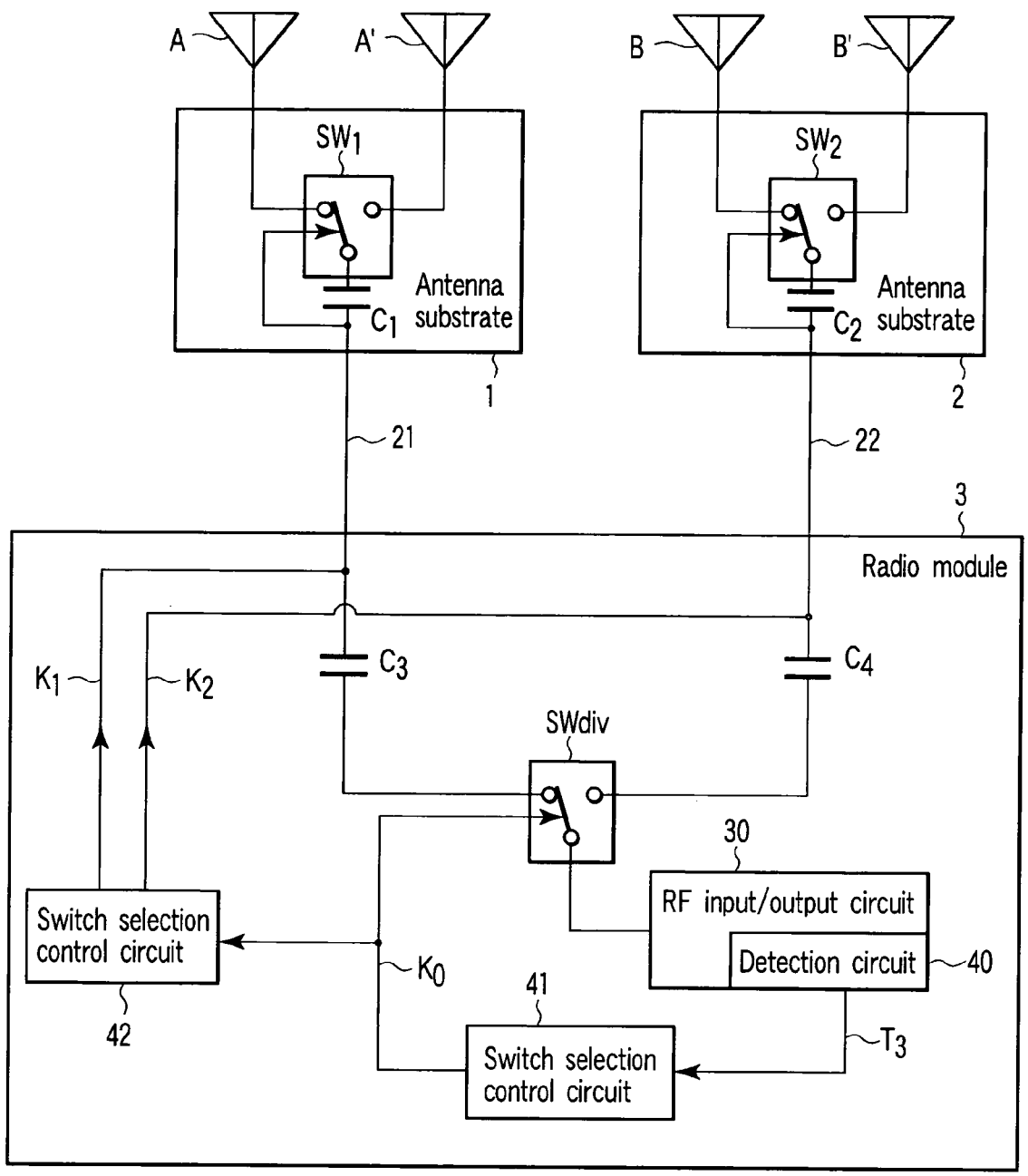
FIG. 6 is a block diagram showing a modification to the configuration shown in FIG. 5.

FIG. 6 is a block diagram showing a modification to the configuration shown in FIG. 5. In FIG. 6, the same elements as those of FIG. 5 are denoted by the same reference numerals and symbols.

The configuration of FIG. 6 differs from that of FIG. 5 in the arrangement of level detection circuits. In FIG. 5, the two level detection circuits 40A and 40B are connected to their respective cables 21 and 22, whereas, in FIG. 6, one level detection circuit 40 common to the two circuits 40A and 40B is provided inside (or outside) the RF input/output circuit 30.

The first switch selection control circuit 41 has to control the diversity switch SWdiv with given timing so that the level detection circuit 40 can detect both a level of a signal received by the antenna A or A' and that of a signal received by the antenna B or B'.

Figure 7:
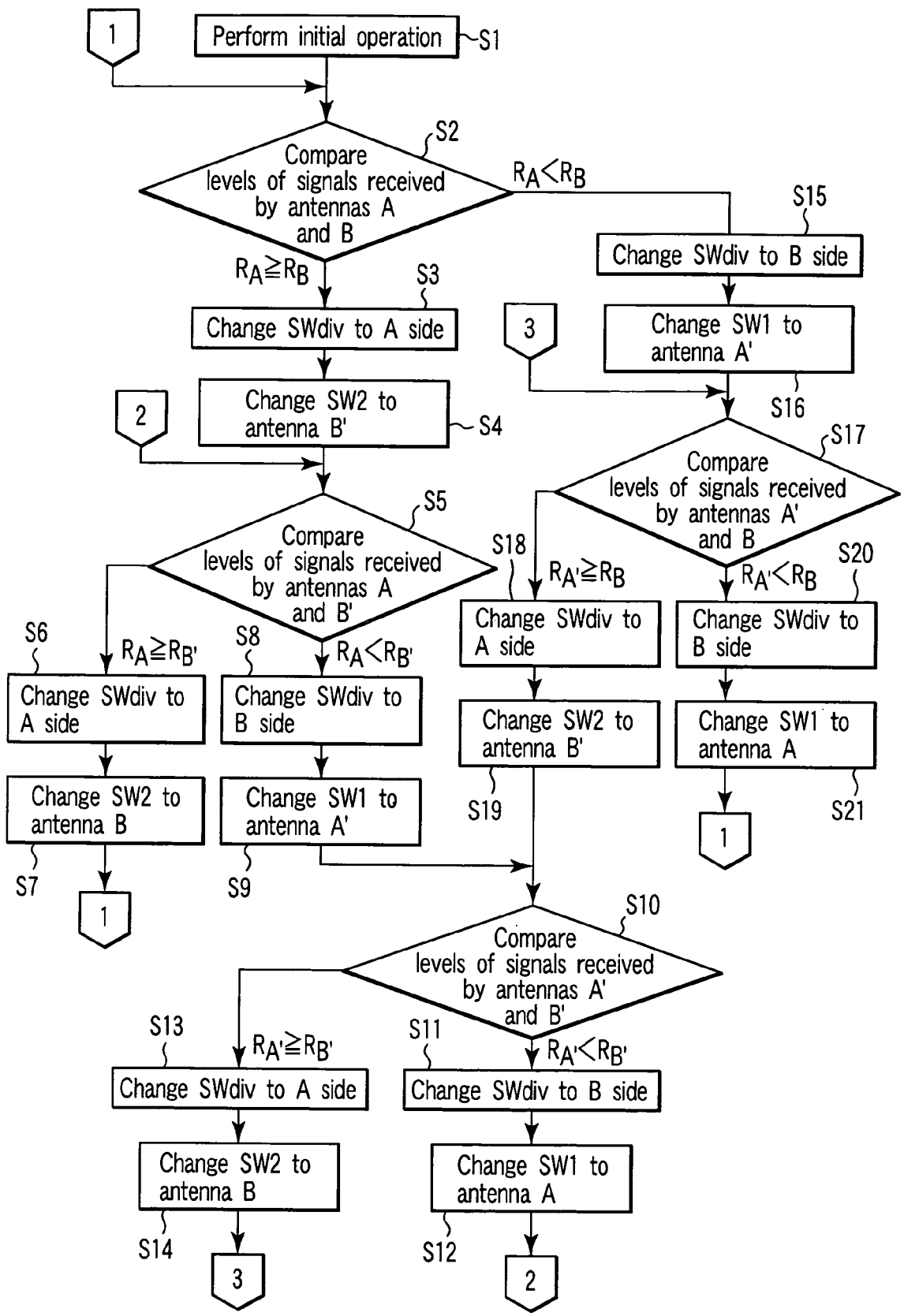
FIG. 7 is a flowchart showing a diversity antenna selecting operation of the notebook personal computer according to the embodiment of the present invention.

A diversity antenna selecting operation according to the present embodiment will be described with reference to the flowchart shown in FIG. 7. In this operation, a section associated with the cable 21 will be referred to as an A side and a section associated with the cable 22 will be referred to as a B-side.

In the initial operation, the selection switches SW1 and SW2 are controlled to select the antennas A and B (step S1).

Then, the first switch selection control circuit 41 compares the level RA of a signal received by the antenna A and the level RB of a signal received by the antenna B (step S2). When RA is not lower than RB, the diversity selection switch SWdiv is changed to the A side in response to the selection control signal K0 in order to select the antenna A whose signal reception level is higher (step S3). The second switch selection control circuit 42, which detects the selection control signal K0, changes the selection switch SW2 to the antenna B' in response to the selection control signal K2 (step S4). The flow moves to step S5.

The first switch selection control circuit 41 compares the level RA of a signal received by the antenna A and the level RB' of a signal received by the antenna B' (step S5). When RA is not lower than RB', the diversity selection switch SWdiv is maintained at (or changed to) the A side in response to the selection control signal K0 in order to select the antenna A whose signal reception level is higher (step A6). The second switch selection control circuit 42, which detects the selection control signal K0, changes the selection switch SW2 to the antenna B in response to the selection control signal K2 (step S4). The flow goes to step S2.

In step S5, when RA is lower than RB', the diversity selection switch SWdiv is changed to (or maintained at) the B side in response to the selection control signal K0 in order to select the antenna B' whose signal reception level is higher (step S8). The second switch selection control circuit 42, which detects the selection control signal K0, changes the selection switch SW1 to the antenna A' in response to the selection control signal K1 (step S9). The flow moves to step S10.

The first switch selection control circuit 41 compares the level RA' of a signal received by the antenna A' and the level RB' of a signal received by the antenna B' (step S10). When RA is lower than RB', the diversity selection switch SWdiv is maintained at (or changed to) the B side in response to the selection control signal K0 in order to select the antenna B' whose signal reception level is higher (step S11). The second switch selection control circuit 42, which detects the selection control signal K0, changes the selection switch SW1 to the antenna A in response to the selection control signal K1 (step S12). The flow moves to step S5.

In step S10, when RA' is not lower than RB', the diversity selection switch SWdiv is changed to (or maintained at) the A side in response to the selection control signal K0 in order to select the antenna A' whose signal reception level is higher (step S13). The second switch selection control circuit 42, which detects the selection control signal K0, changes the selection switch SW2 to the antenna B in response to the selection control signal K2 (step S14). The flow goes to step S17.

In step S2, when RA is lower than RB, the diversity selection switch SWdiv is changed to the B side in response to the selection control signal K0 in order to select the antenna B whose signal reception level is higher (step S15). The second switch selection control circuit 42, which detects the selection control signal K0, changes the selection switch SW1 to the antenna A' in response to the selection control signal K1 (step S16). The flow moves to step S17.

The first switch selection control circuit 41 compares the level RA' of a signal received by the antenna A' and the level RB of a signal received by the antenna B (step S17). When RA' is not lower than RB, the diversity selection switch SWdiv is changed to (or maintained at) the A side in response to the selection control signal K0 in order to select the antenna A' whose signal reception level is higher (step S18). The second switch selection control circuit 42, which detects the selection control signal K0, changes the selection switch SW2 to the antenna B' in response to the selection control signal K2 (step S19). The flow goes to step S10.

In step S17, when RA' is lower than RB, the diversity selection switch SWdiv is changed to (or maintained at) the B side in response to the selection control signal K0 in order to select the antenna B whose signal reception level is higher (step S20). The second switch selection control circuit 42, which detects the selection control signal K0, changes the selection switch SW1 to the antenna A in response to the selection control signal K1 (step S21). The flow moves to step S2.

As described above, a selecting control operation for sending a signal to the RF input/output circuit 30 from an antenna whose signal level is higher is repeated. Thus, a high-performance diversity antenna having both space diversity effect and polarization diversity effect is achieved.

According to the embodiment of the present invention, a diversity antenna that has both polarization diversity characteristics and space diversity characteristics and suppresses the increase in area and cost can be achieved. Furthermore, the communication-capable range of the diversity antenna can be widened irrespective of antenna polarization characteristics of a radio communication device of a communication partner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information device, comprising:
    a main unit;
    a display unit which opens and closes rotatably with respect to the main unit;
    a first horizontally polarized antenna and a first vertically polarized antenna both provided in a first position of the display unit; and
    a second horizontally polarized antenna and a second vertically polarized antenna both provided in a second position of the display unit,
    one of the first horizontally polarized antenna, the first vertically polarized antenna, the second horizontally polarized antenna, and the second vertically polarized antenna being repeatedly selected based on signal levels, and
    the first position corresponding to an upper left portion of the display unit when the display unit opens, and the second position corresponding to an upper right portion of the display unit when the display unit opens.

2. The information device according to claim 1, wherein the first and second horizontally polarized antennas and the first and second vertically polarized antennas are included in a housing of the display unit.

3. The information device according to claim 1, wherein the first horizontally polarized antenna and the first vertically polarized antenna have a same shape and are shifted 90 degrees from each other, and the second horizontally polarized antenna and the second vertically polarized antenna have a same shape and are shifted 90 degrees from each other.

4. The information device according to claim 1, further comprising:
    a first selection switch to select one of the first horizontally polarized antenna and the first vertically polarized antenna for use; and
    a second selection switch to select one of the second horizontally polarized antenna and the second vertically polarized antenna for use.

5. The information device according to claim 4, further comprising:
    a radio module provided in the main unit; and
    two wires which electrically connect the radio module and two antennas selected by the first and second selection switches.

6. The information device according to claim 5, wherein the radio module includes:
    a third selection switch to select one of the wires;
    a first switch selection control circuit which outputs a first selection control signal to the third selection switch; and
    a second switch selection control circuit which transmits a second selection control signal to one of the first and second selection switches through one of the wires in response to the first selection control signal output from the first switch selection control circuit.

7. The information device according to claim 1, wherein the information device is a notebook personal computer.

* * * * *